(12) United States Patent
Manning et al.

(10) Patent No.: US 9,321,947 B2
(45) Date of Patent: Apr. 26, 2016

(54) ABRASIVE PRODUCTS AND METHODS FOR FINISHING COATED SURFACES

(71) Applicants: James J. Manning, Braintree, MA (US); Jianna Wang, Grafton, MA (US); Charles G. Herbert, Shrewsbury, MA (US); William C. Rice, Medway, MA (US); Anuj Seth, Northborough, MA (US)

(72) Inventors: James J. Manning, Braintree, MA (US); Jianna Wang, Grafton, MA (US); Charles G. Herbert, Shrewsbury, MA (US); William C. Rice, Medway, MA (US); Anuj Seth, Northborough, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 670 days.

(21) Appl. No.: 13/738,754

(22) Filed: Jan. 10, 2013

(65) Prior Publication Data

US 2013/0189911 A1    Jul. 25, 2013

Related U.S. Application Data

(60) Provisional application No. 61/585,219, filed on Jan. 10, 2012, provisional application No. 61/585,540, filed on Jan. 11, 2012.

(51) Int. Cl.
| | |
|---|---|
| *B24D 11/00* | (2006.01) |
| *C09K 3/14* | (2006.01) |
| *B24D 3/00* | (2006.01) |

(52) U.S. Cl.
CPC ............... *C09K 3/1409* (2013.01); *B24D 3/00* (2013.01)

(58) Field of Classification Search
CPC ...... B24D 11/00; B24D 11/28; C09K 3/1436; C09D 163/00
USPC ......... 451/41, 28, 539; 51/297, 298, 295, 293
See application file for complete search history.

(56) References Cited

U.S. PATENT DOCUMENTS

| | | |
|---|---|---|
| 2,277,520 A | 3/1942 | Martin et al. |
| 3,916,584 A | 11/1975 | Howard et al. |

(Continued)

FOREIGN PATENT DOCUMENTS

| | | |
|---|---|---|
| CN | 1088506 A | 6/1994 |
| CN | 1355769 A | 6/2002 |

(Continued)

OTHER PUBLICATIONS

SK Chemicals Co., Ltd., "Skybon, ES-120 Thermoplastic Copolyester for Solventborne Applications," 1 pg.

(Continued)

*Primary Examiner* — Robert Rose
(74) *Attorney, Agent, or Firm* — Joseph P. Sullivan; Abel Law Group, LLP

(57) ABSTRACT

A coated abrasive product includes green, unfired abrasive aggregates having a generally spheroidal or toroidal shape, the aggregates formed from a composition comprising abrasive grit particles, a nanoparticle binder, a sulfosuccinate, and a crosslinking, wherein the abrasive aggregates are dispersed within a polymer resin coating comprising a mixture of copolyester resin. The coated abrasive product is capable of finishing coated surfaces and repairing defects in coated surfaces, including surfaces coated with automotive primers, paints, clear coats, and combinations thereof.

20 Claims, 5 Drawing Sheets

(56) References Cited

U.S. PATENT DOCUMENTS

| | | |
|---|---|---|
| 3,928,949 A | 12/1975 | Wagner |
| 4,018,574 A | 4/1977 | Dyer |
| 4,311,489 A | 1/1982 | Kressner |
| 4,547,204 A | 10/1985 | Caul |
| 4,576,612 A | 3/1986 | Shukla et al. |
| 4,609,380 A | 9/1986 | Barnett et al. |
| 4,629,473 A | 12/1986 | Ruid et al. |
| 4,644,703 A | 2/1987 | Kaczmarek et al. |
| 4,652,275 A | 3/1987 | Bloecher et al. |
| 4,751,138 A | 6/1988 | Tumey et al. |
| 4,842,619 A | 6/1989 | Fritz et al. |
| 4,867,759 A | 9/1989 | Tiefenbach et al. |
| 4,918,874 A | 4/1990 | Tiefenbach, Jr. |
| 4,920,082 A | 4/1990 | Danielson |
| 4,927,431 A * | 5/1990 | Buchanan ............... B24D 3/344 427/520 |
| 5,011,513 A | 4/1991 | Zador et al. |
| 5,014,468 A | 5/1991 | Ravipati et al. |
| 5,094,670 A | 3/1992 | Imada |
| 5,108,463 A | 4/1992 | Buchanan |
| 5,137,542 A | 8/1992 | Buchanan et al. |
| 5,198,292 A | 3/1993 | Lerner et al. |
| 5,219,462 A | 6/1993 | Bruxvoort et al. |
| 5,250,085 A | 10/1993 | Mevissen |
| 5,256,170 A | 10/1993 | Harmer et al. |
| 5,304,586 A | 4/1994 | Hammesfahr et al. |
| 5,328,716 A | 7/1994 | Buchanan |
| 5,360,462 A | 11/1994 | Harmer et al. |
| 5,431,596 A | 7/1995 | Akita |
| 5,436,063 A | 7/1995 | Follett et al. |
| 5,437,754 A | 8/1995 | Calhoun |
| 5,453,312 A | 9/1995 | Haas et al. |
| 5,454,844 A | 10/1995 | Hibbard et al. |
| 5,549,719 A | 8/1996 | Lee et al. |
| 5,584,897 A * | 12/1996 | Christianson .......... B24D 11/02 156/137 |
| 5,632,668 A | 5/1997 | Lindholm et al. |
| 5,667,541 A | 9/1997 | Klun et al. |
| 5,672,097 A | 9/1997 | Hoopman |
| 5,730,764 A | 3/1998 | Williamson et al. |
| 5,766,277 A * | 6/1998 | DeVoe ..................... B24D 3/28 51/295 |
| 5,833,724 A | 11/1998 | Wei et al. |
| 5,840,088 A | 11/1998 | Yang et al. |
| 5,863,239 A | 1/1999 | Barton, II |
| 5,863,306 A | 1/1999 | Wei et al. |
| 5,863,847 A | 1/1999 | DeVoe et al. |
| 5,876,268 A | 3/1999 | Lamphere et al. |
| 5,906,490 A | 5/1999 | Kramer Primus et al. |
| 5,913,716 A | 6/1999 | Mucci et al. |
| 5,924,917 A | 7/1999 | Benedict et al. |
| 5,954,844 A | 9/1999 | Law et al. |
| 6,024,634 A | 2/2000 | Hoglund et al. |
| 6,074,281 A | 6/2000 | Swanson et al. |
| 6,077,601 A | 6/2000 | DeVoe et al. |
| 6,155,910 A | 12/2000 | Lamphere et al. |
| 6,171,224 B1 | 1/2001 | Phillips |
| 6,197,076 B1 | 3/2001 | Braunschweig et al. |
| 6,231,629 B1 | 5/2001 | Christianson et al. |
| 6,238,450 B1 | 5/2001 | Garg et al. |
| 6,258,136 B1 | 7/2001 | Kinisky et al. |
| 6,261,682 B1 | 7/2001 | Law |
| 6,287,184 B1 | 9/2001 | Carpentier et al. |
| 6,372,336 B1 * | 4/2002 | Clausen .................. B24D 3/28 428/323 |
| 6,375,692 B1 | 4/2002 | Manwiller et al. |
| 6,395,044 B1 | 5/2002 | Swei et al. |
| 6,406,576 B1 | 6/2002 | Benedict et al. |
| 6,451,076 B1 | 9/2002 | Nevoret et al. |
| 6,517,423 B2 | 2/2003 | Ueno |
| 6,551,366 B1 | 4/2003 | D'Souza et al. |
| 6,551,974 B1 | 4/2003 | Conrad et al. |
| 6,645,624 B2 | 11/2003 | Adefris et al. |
| 6,648,999 B2 | 11/2003 | Burdon et al. |
| 6,702,650 B2 | 3/2004 | Adefris |
| 6,753,359 B2 | 6/2004 | Thurber et al. |
| 6,773,475 B2 | 8/2004 | Ohishi |
| 6,790,126 B2 | 9/2004 | Wood et al. |
| 6,797,023 B2 | 9/2004 | Knapp et al. |
| 6,858,292 B2 | 2/2005 | Kendall |
| 6,953,381 B2 | 10/2005 | Siders et al. |
| 7,005,080 B2 | 2/2006 | Holland et al. |
| 7,066,801 B2 | 6/2006 | Balijepalli et al. |
| 7,279,119 B2 | 10/2007 | Hellring et al. |
| 7,294,158 B2 | 11/2007 | Welygan et al. |
| 7,594,845 B2 | 9/2009 | Lugg et al. |
| 7,658,665 B2 | 2/2010 | Subramanian et al. |
| 7,935,158 B2 | 5/2011 | Querel et al. |
| 7,981,173 B2 | 7/2011 | Ali et al. |
| 8,038,751 B2 | 10/2011 | Starling |
| 8,043,393 B2 | 10/2011 | Querel et al. |
| 8,062,098 B2 | 11/2011 | Deuscher |
| 8,105,453 B2 | 1/2012 | Kawamura et al. |
| 8,361,176 B2 | 1/2013 | Seth et al. |
| 9,168,638 B2 | 10/2015 | Manning et al. |
| 2001/0003884 A1 | 6/2001 | Wei et al. |
| 2002/0090891 A1 | 7/2002 | Adefris et al. |
| 2003/0066246 A1 | 4/2003 | Swei et al. |
| 2003/0150169 A1 | 8/2003 | Annen |
| 2003/0175498 A1 | 9/2003 | Hunt et al. |
| 2003/0213182 A1 | 11/2003 | Knapp et al. |
| 2004/0067649 A1 | 4/2004 | Hellring et al. |
| 2004/0115431 A1 | 6/2004 | Chen et al. |
| 2005/0064805 A1 | 3/2005 | Culler et al. |
| 2005/0113005 A1 | 5/2005 | Woo et al. |
| 2005/0223649 A1 | 10/2005 | O'Gary et al. |
| 2006/0026904 A1 | 2/2006 | Woo et al. |
| 2006/0046622 A1 | 3/2006 | Prasad |
| 2006/0148392 A1 | 7/2006 | Ono et al. |
| 2006/0183412 A1 | 8/2006 | Allison et al. |
| 2006/0260208 A1 | 11/2006 | Swei et al. |
| 2007/0066197 A1 | 3/2007 | Woo et al. |
| 2007/0243802 A1 | 10/2007 | Peterson et al. |
| 2007/0298240 A1 | 12/2007 | Gobena et al. |
| 2008/0092455 A1 | 4/2008 | You |
| 2008/0172951 A1 * | 7/2008 | Starling ............... C09K 3/1436 51/308 |
| 2009/0011692 A1 | 1/2009 | Miekka et al. |
| 2010/0005727 A1 | 1/2010 | Gaeta et al. |
| 2010/0022170 A1 | 1/2010 | Starling et al. |
| 2010/0107509 A1 | 5/2010 | Guselin |
| 2010/0159805 A1 | 6/2010 | Goldsmith et al. |
| 2011/0045739 A1 | 2/2011 | Keijzer et al. |
| 2011/0053460 A1 | 3/2011 | Culler et al. |
| 2012/0094579 A1 | 4/2012 | Starling |
| 2012/0192500 A1 | 8/2012 | Wang et al. |
| 2015/0352689 A1 | 12/2015 | Manning et al. |

FOREIGN PATENT DOCUMENTS

| | | |
|---|---|---|
| CN | 1481296 A | 3/2004 |
| CN | 1483067 A | 3/2004 |
| CN | 1787966 A | 6/2006 |
| CN | 101068656 A | 11/2007 |
| CN | 101267915 A | 9/2008 |
| DE | 2350139 | 4/1975 |
| EP | 193296 A1 | 9/1986 |
| EP | 444824 A2 | 9/1991 |
| EP | 211591 B1 | 3/1993 |
| EP | 650803 A1 | 5/1995 |
| EP | 1339531 B1 | 8/2007 |
| EP | 2436747 A3 | 4/2012 |
| JP | 61192479 | 8/1986 |
| JP | 61297083 | 12/1986 |
| JP | 6234780 A | 2/1987 |
| JP | H01303626 | 12/1989 |
| JP | H04500044 A | 1/1992 |
| JP | 63052971 | 3/1998 |
| JP | 10-202538 A | 8/1998 |
| JP | 2003011068 | 1/2003 |
| JP | 2003062754 | 3/2003 |
| JP | 2003071729 | 3/2003 |
| JP | 2003511249 | 3/2003 |
| JP | 2004174712 | 6/2004 |

(56) References Cited

FOREIGN PATENT DOCUMENTS

| | | |
|---|---|---|
| JP | 2005515950 A | 6/2005 |
| JP | 2005522341 | 7/2005 |
| JP | 2006510499 | 3/2006 |
| JP | 2008000853 | 1/2008 |
| TW | 200422366 A | 11/2004 |
| WO | 9001397 A1 | 2/1990 |
| WO | 9201536 A1 | 2/1992 |
| WO | 9803306 A1 | 1/1998 |
| WO | 0238338 A2 | 5/2002 |
| WO | 02102920 A1 | 12/2002 |
| WO | 2005099280 A2 | 10/2005 |
| WO | 2006050792 A1 | 5/2006 |
| WO | 2006112909 A1 | 10/2006 |
| WO | 2007035292 A1 | 3/2007 |
| WO | 2008008535 A1 | 1/2008 |
| WO | 2008091939 A3 | 7/2008 |
| WO | 2010011579 A2 | 1/2010 |
| WO | 2010075041 A2 | 7/2010 |

OTHER PUBLICATIONS

Norton, Saint-Gobain, "High-Performance Lapping Products for Roll Finishing," Copyright Saint-Gobain Abrasives, Inc., Rev. Feb. 2011, 2 pgs.

Burgess Pigment, "Burgess No. 98, Hydrous Aluminum Silicate" 1 pg.

ADM, "Material Safely Data Sheet—Yelkin TS", Preparation Date: Apr. 17, 2009, Revision Date: Apr. 17, 2009, 7 pgs.

Momentive, "Technical Data Sheet, EPON™ Resin 1001F", Re-issued Sep. 2007, 4 pgs.

Carbide Depot, "Hardness Conversion Chart", Technical Resources for Manufacturing Professionals, 3 pgs.

Woods, Susan, Cutting Tool Engineering Plus, "High-Velocity Grind", Feb. 2011, vol. 63, Issue 2, 9 pgs.

Werner Blank, "Isocyanate—TDI Isocyanate", Last edited on: Jul. 6, 2006, 3 pgs.

BYK Additives & Instruments, "BYK-410 Material Safety Data Sheet" Version 4, Revision Date Feb. 7, 2011, Print Date Feb. 7, 2011, 10 pgs.

BYK Additives & Instruments, "BYK-410 Data Sheet—Liquid Rheology Additives for Solvent-borne and Solvent-free Systems" Data Sheet R200, Issue 02/10, 4 pgs.

ROHM and HAAS, "Adcote™ 545S/Coreactant F", Copyright Rohm and Haas, 2008, 3 pgs.

3M Innovation, "Systematic Processes for Finishing Wear Resistant Thermal Spray Coatings with Flexible Superabrasives," Sponsored by ESTCP, JG-PP, PEWG, Nov. 19, 2003, 31 pgs.

3M Corporation, "Roll Grinding, Superfinishing and Microfinishing Systems," Superabrasives and Microfinishing Systems Division, Copyright 3M 1996, 12 pgs.

SKChemicals, Skybon Product Info, accessed Apr. 28, 2012 at http://www.skchemicals.com/english/products/poly/sub/sub3-1.asp, 2 pgs.

CYTEC "Cymel® Amino Resin Crosslinkers for the Coating Industry, Product and Application Guide, Europe, Middle East and Africa", Copyright 2008 Cytec Industries, Inc., 42 pgs.

Air Products "Dabco© T-12 Catalyst", Copyright, Air Products and Chemicals, Inc., 2003, 2 pgs.

International Search Report for PCT/US2008/051785 mailed Aug. 6, 2008, 1 pg.

International Search Report for PCT/US2009/051045 mailed Mar. 3, 2010, 1 pg.

International Search Report for PCT/US2009/067914 mailed Jul. 26, 2010, 1 pg.

International Search Report for PCT/US2013/032402 mailed Jul. 1, 2013, 1 pg.

International Search Report for PCT/US2012/057852 mailed Mar. 5, 2013, 1 pg.

International Search Report for PCT/US2013/021039 mailed Apr. 25, 2013, 1 pg.

International Search Report for PCT/US2013/034700 mailed Jul. 13, 2013, 1 pg.

International Search Report for PCT/US2013/048730 mailed Sep. 11, 2013, 1 pg.

International Search Report for PCT/US2011/068249 mailed Aug. 29, 2012, 1 pg.

* cited by examiner

ABRASIVE PRODUCTS AND METHODS FOR FINISHING COATED SURFACES

CROSS-REFERENCE TO RELATED APPLICATION(S)

The present application claims priority from U.S. Provisional Patent Application No. 61/585,219, filed Jan. 10, 2012, entitled "ABRASIVE PRODUCTS AND METHODS FOR FINISHING COATED SURFACES," naming inventors James Manning, Jianna Wang, Charles Herbert, William Rice and Anuj Seth, and also claims priority from U.S. Provisional Patent Application No. 61/585,540, filed Jan. 11, 2012, entitled "ABRASIVE PRODUCTS AND METHODS FOR FINISHING COATED SURFACES," naming inventors James Manning, Jianna Wang, Charles Herbert, William Rice and Anuj Seth, which application is incorporated by reference herein in its entirety.

BACKGROUND

1. Field of the Disclosure

The present disclosure is generally directed to abrasive products and methods related to the polishing and finishing of coated surfaces, including surfaces coated with automotive primer, automotive paint, automotive clear coat, or combinations thereof.

2. Description of the Related Art

Abrasive articles, such as coated abrasive articles, are used in various industries to abrade work pieces by hand or by machine processes, such as by lapping, grinding, or polishing. Machining utilizing abrasive articles spans a wide industrial and consumer scope from optics industries, automotive paint repair industries, and metal fabrication industries to construction and carpentry. Machining, such as by hand or with use of commonly available tools such as orbital polishers (both random and fixed axis), and belt and vibratory sanders, is also commonly performed. In each of these examples, abrasives are used to remove surface material and affect the surface characteristics (e.g., planarity, surface roughness, gloss, lack surface defects) of the abraded surface. Additionally, various types of automated processing systems have been developed to abrasively process articles of various compositions and configurations.

Surface characteristics include, among others, shine, texture, gloss, surface roughness, and uniformity. In particular, surface characteristics, such as roughness, gloss, and lack of surface imperfections are measured to determine quality. For example, when coating or painting a surface certain imperfections or surface defects may occur during the application or curing process. Such surface imperfections or surface defects might include pock marks, "orange peel" texture, "fish eyes", encapsulated bubbles, and dust defects, a.k.a., "dust nibs." Typically, such defects in a painted surface are removed by first sanding with a coarse grain abrasive, followed by subsequently sanding with progressively finer grain abrasives, and even buffing with wool or foam pads until a desired smoothness is achieved. Hence, the properties of the abrasive article used will generally influence the surface quality.

In addition to surface characteristics, industries are sensitive to cost related to abrasive operations. Factors influencing operational costs include the speed at which a surface can be prepared and the cost of the materials used to prepare that surface. Typically, the industry seeks cost effective materials having high material removal rates.

However, abrasives that exhibit high removal rates often exhibit poor performance in achieving desirable surface characteristics. Conversely, abrasives that produce desirable surface characteristics often have low material removal rates. For this reason, preparation of a surface is often a multi-step process using various grades of abrasive sheets. Typically, surface flaws (e.g., scratches) introduced by one step are repaired (e.g., removed) using progressively finer grain abrasives in one or more subsequent steps. Therefore, abrasives that introduce scratches and surface flaws result in increased time, effort, and expenditure of materials in subsequent processing steps and an overall increase in total processing costs.

An additional factor affecting material removal rate and surface quality is the "loading" of the abrasive with "swarf", i.e., the material that is abraded from the workpiece surface, which tends to accumulate on the surface of, and between, the abrasive particles. Loading is undesirable because it typically reduces the effectiveness of the abrasive product and can also negatively affect surface characteristics by increasing the likelihood of scratching defects.

The surface characteristics and material removal rate can also be affected by the durability of the abrasive article. Abrasive articles that wear easily or lose grains can exhibit both a low material removal rate and can cause surface defects. Quick wear on the abrasive article can lead to a reduction in material removal rate, resulting in frequent exchanging of the abrasive article and increased waste associated with discarded abrasive articles.

There continues to be a demand for improved, cost effective, abrasive articles, processes, and systems that promote efficient abrasion and improved surface characteristics.

SUMMARY

In an embodiment, a coated abrasive product comprising a backing and an abrasive slurry comprising polymeric resin, abrasive aggregates, a crosslinking agent, a catalyst, and organic solvent, wherein the abrasive aggregates are green, unfired and have a generally spheroidal or toroidal shape and are formed from a composition comprising abrasive grit particles, a nanoparticle binder, a sulfosuccinate, and a crosslinking agent, and wherein the abrasive slurry is applied to the backing. The abrasive slurry can further comprise a surfactant. The polymeric resin can be a polyester resin, a copolyester resin, a mixture of more than one copolyester resin, or combinations thereof.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE EMBODIMENT(S)

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
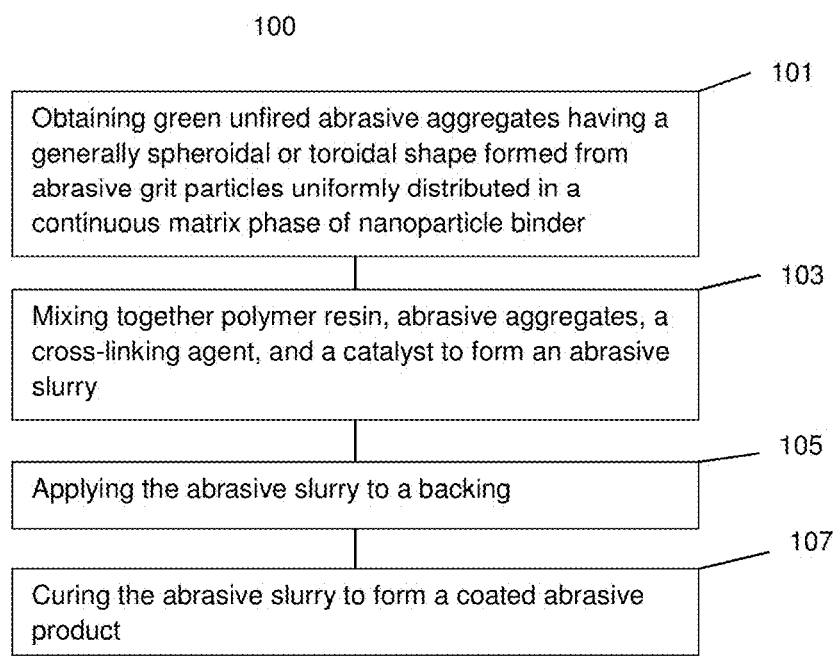
FIG. 1 is a process diagram of an embodiment of a method of forming an abrasive product.
Figure 2:
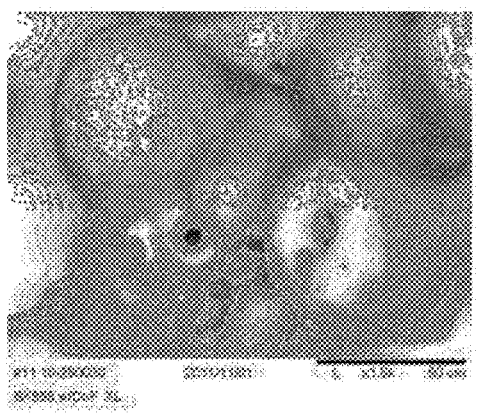
FIG. 2 is a photomicrograph taken with a scanning electron microscope showing, prior to usage, a cured abrasive layer of an abrasive product that has green unfired aggregates dispersed within a cured polymeric coating.
Figure 3:
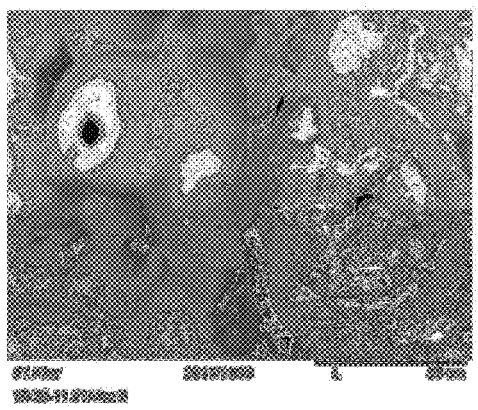
FIG. 3 is a photomicrograph of the same embodiment, after usage, showing partial wear of the exposed abrasive aggregates.
Figure 4:
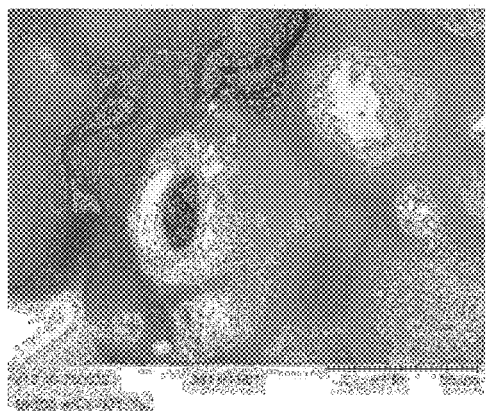
FIG. 4 is a photomicrograph taken with a scanning electron microscope showing, prior to usage, the cured abrasive layer of an alternate embodiment of an abrasive product that has green unfired aggregates dispersed in a different cured polymeric coating.
Figure 5:
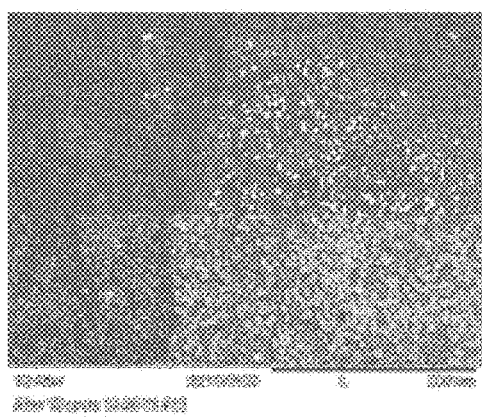
FIG. 5 is a photomicrograph of the same embodiment, after usage, showing wear of the abrasive aggregates.
Figure 6:
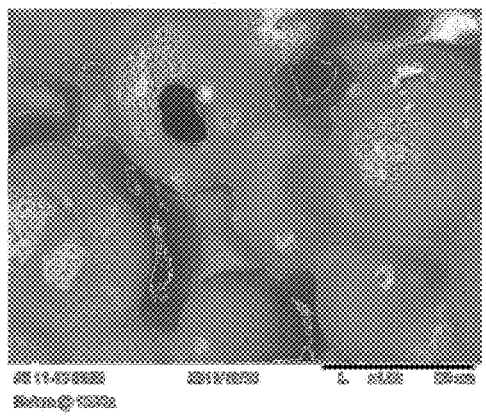
FIG. 6 is a photomicrograph taken with a scanning electron microscope showing, prior to usage, the cured abrasive layer of another embodiment of an abrasive product that has green unfired aggregates dispersed in a blend of cured polymeric coating.
Figure 7:
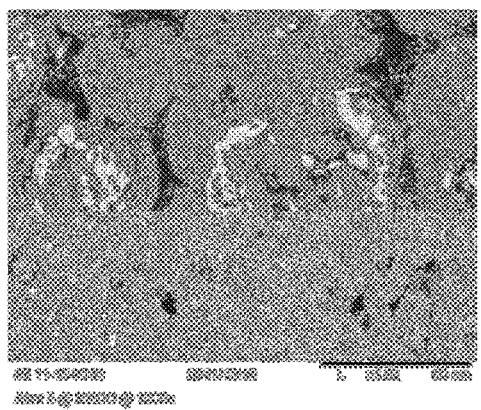
FIG. 7 is a photomicrograph of the same embodiment, after usage, showing an improved even wear an exposure of the abrasive aggregates.

FIG. 1 shows a particular embodiment of a method 100 of making a coated abrasive product. The process is initiated at activity 101 by obtaining green, unfired abrasive aggregates having a generally spheroidal or toroidal shape, the abrasive aggregates being formed from a composition comprising abrasive grit particles and a nanoparticle binder, wherein the nanoparticle binder forms a continuous matrix phase in which the abrasive grit particles are uniformly distributed. In activity 103, mixing together of polymer resin, the abrasive aggregates, a cross-linking agent, and a catalyst occurs to form an abrasive slurry. In activity 105, applying the abrasive slurry to a backing occurs. Curing of the abrasive slurry occurs in activity 107 to form a coated abrasive product.

As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of pressure or hand agitation.

Abrasive Aggregates

According to an embodiment, abrasive aggregates are provided that are particularly suitable for machining operations, in which abrasion is carried out to remove material and improve surface quality. Abrasive aggregates can be formed through slurry-based processing. Embodiments can take advantage of spray drying, where a slurry containing the constituent materials of the aggregates and a liquid carrier, such as water, are mixed together, nebulized into droplets, and dried. Certain embodiments combine an abrasive grit, a binder, a dispersant, and a cross-linking agent.

Suitable green, unfired abrasive aggregates include, for instance, those described in, and produced according to the methods of U.S. Pat. No. 8,038,751 to Starling. The teachings of U.S. Pat. No. 8,038,751 to Starling that are related to the making of green, unfired abrasive aggregates are hereby incorporated by reference for all purposes. Suitable abrasive aggregates are also available from Saint-Gobain Abrasives, Inc. under the brand name Nanozyte® and are exemplary of green, unfired abrasive aggregates. According to certain embodiments, the abrasive product includes green unfired abrasive aggregates having a composite structure, including both abrasive grits that have a size within the microparticle range, and a nanoparticle binder that provides the matrix of the abrasive aggregate in which the abrasive grits are embedded or contained.

Typically, the abrasive aggregates are utilized in the abrasive product without notable post-formation heat treatment, such as calcining, sintering, or recrystallization that would alter the crystallite size, grain size, density, tensile strength, young's modulus, and the like of the abrasive aggregates. Such heat treatment processes, though common, and which are generally carried out in excess of 400° C., generally 500° C. and above, easily ranging from 800° C. to 1200° C. and above for certain ceramic species, are not utilized herein.

The abrasive aggregates have a notable morphology, characterized by uniform distribution of the abrasive grits in the nanoparticle binder. Additionally, the abrasive aggregates have a generally spheroidal or a toroidal shape, the abrasive aggregates formed from a composition comprising abrasive grit particles and a nanoparticle binder. The aggregates can be solid spheres, spheroids, and toroids. Alternatively, the aggregates can be hollow spheres, spheroids, and toroids. When viewed under magnification, as shown in the scanning electron micrographs of FIGS. 2, 4, and 6, the abrasive aggregates have a generally spheroidal shape, being characterized as rounded or spherical. In some instances, however, the abrasive aggregates may be observed to have a void near the center of the abrasive aggregate and thus exhibit a more toroid- or torus-like shape as seen in the scanning electron micrographs of FIGS. 2, 4, and 6. Individual particles of the abrasive grit material, such as silicon carbide grit, can be observed to be dispersed over the surface of the abrasive aggregates and within the interior thereof. It is noted that FIGS. 2-7 show dispersed, individual abrasive aggregates that are bound together in a resin binder system.

The size and the size range of the abrasive aggregates may be adjusted and may depend on many factors, including the composition of the mixture and, if a spray dryer is used in the abrasive aggregate formation, the spray dryer feed rate. For example, abrasive aggregates of sizes including those of approximately 15 micrometers, 20 micrometers, 35 micrometers, 40 micrometers, 45 micrometers, 50 micrometers, 55 micrometers, 60 micrometers, 65 micrometers, and 70 micrometers have been successfully produced using a spray dryer. These abrasive aggregates can include abrasive grit particles ranging from about 5 to about 15 micrometers. In particular embodiments, the abrasive aggregate size ranges from about 20 micrometers to about 70 micrometers, about 30 micrometers to about 65 micrometers, or about 35 micrometers to about 60 micrometers. In another embodiment, the average abrasive aggregate size ranges from about 45 to about 55 micrometers, or about 50 micrometers.

Further study of the abrasive aggregates has revealed that in some embodiments spheroids are hollow, while in other embodiments the aggregates are solid, and in even other embodiments, the aggregates are essentially filled with grain and/or nanoparticle binder. Hollow particles can be analogized to thick-shelled racquet balls, having a wall thickness ($t_w$) within a range of about 0.08 to about 0.4 times the average particle size of the abrasive aggregates. Process parameters and compositional parameters can be modified to effect different wall thicknesses.

Once formed, the abrasive aggregates may, if desired, be classified and/or separated into various size ranges before being applied to a backing or otherwise utilized in a polishing operation. Classification of the abrasive aggregates can be accomplished by sieving, sorting, or gravimetric separation techniques. In an embodiment, the abrasive aggregates can be classified by being passed through a standard size mesh screen, such as for example a standard 170 mesh screen, which allows pass-though of particles having an average particle size of approximately 90 microns.

Abrasive Grit Particles

The abrasive grit particles that form the abrasive aggregates generally have a Mohs hardness of greater than about 3, and preferably from about 3 to about 10. For particular applications, the abrasive grit particles have a Mohs hardness at least 5, 6, 7, 8, or 9. In an embodiment the abrasive grit particles have a Mohs hardness of 9. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and/or cerium oxide materials, with silicon carbide being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same abrasive aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations. Further, the abrasive grit particles may be treated so as to form a metallurgical coating on the individual particles prior to incorporation into the abrasive aggregates. The superabrasive grits are particularly suitable for coating. Typical metallurgical coatings include nickel, titanium, copper, silver and alloys and mixtures thereof.

In general, the size of the abrasive grit particles lies in the microparticle range. As used herein, the term "microparticle," may be used to refer to a particle having an average particle size of from about 0.1 microns to about 50 microns, preferably at least about 0.2 microns, about 0.5 microns, or about 0.75 microns, and not greater than about 20 microns, such as not greater than about 15 microns. Particular embodiments have an average particle size from about 0.3 microns to about 15 microns. The size of the abrasive grit particles can vary upon the type of grit particles being used. For example, diamond grit particles can have a size of about 0.3 to about 15 microns, silicon carbide grit particles can have a size of about 0.3 to about 15 microns, and aluminum oxide grit particles can have a size of about 0.3 to about 15 microns.

It should be noted that the abrasive grit particles can be formed of abrasive aggregates of smaller particles such as abrasive aggregate nanoparticles, though more commonly the abrasive grits are formed of single particles within the microparticle range. As used herein, the term "nanoparticle," may be used to refer to a particle having an average particle size of from about 5 nm to about 150 nm, typically less than about 100 nm, 80 nm, 60 nm, 50 nm, or less than about 50 nm. For instance, a plurality of nano-sized diamond particles may be aggregated together to provide a microparticle of diamond grit. The size of the abrasive grit particles can vary depending upon the type of grit particles being used.

The amount of abrasive grit in the grain slurry mixture can vary. In an embodiment, the grain slurry mixture can contain at least 0.1% by weight, at least 10% by weight, at least 12% by weight, at least 14% by weight, or at least 18% by weight of abrasive grit. In another embodiment, the grain slurry mixture can contain no more than 70% by weight, no more than 65% by weight, no more than 60% by weight, no more than 55% by weight, no more than 50% by weight, no more than 45% by weight, or no more than 40% by weight of abrasive grit. The amount of abrasive grit in the grain slurry mixture can be within a range comprising any pair of the previous upper and lower limits. In an embodiment, the abrasive grit particles can constitute, before spray drying, between about 0.1% to about 70% by weight, about 10% to about 50% by weight, or about 14% to about 40% by weight of the grain slurry mixture.

The amount of abrasive grit in the spray-dried aggregate can vary. In an embodiment, the spray-dried aggregate can contain at least 0.1% by weight, at least 10% by weight, at least 15% by weight, at least 20% by weight, at least 25% by weight, or at least 30% by weight of abrasive grit. In another embodiment, the spray-dried aggregate can contain no more than 80% by weight, no more than 75% by weight, no more than 70% by weight, no more than 65% by weight, or no more than 60% by weight of abrasive grit. The amount of abrasive grit in the spray-dried aggregate can be within a range comprising any pair of the previous upper and lower limits. In another embodiment, after spray drying, the abrasive grit particles may constitute between about 0.1% to about 80% by weight, between about 10% to about 65% by weight, between about 20% to about 60% by weight, or between about 25% to about 55% by weight of the abrasive grit particles.

In one embodiment according to the present disclosure, abrasive aggregates may be formed using a single size of abrasive grit particle, the size of the grit particle and the resultant aggregates both being tailored to the desired polishing application. In other embodiments, mixtures of two or more differently sized abrasive grit particles may be used in combination to form abrasive aggregates having advantageous characteristics attributable to each of the grit particle sizes.

Nanoparticle Binder

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed abrasive aggregates, the individual nanoparticles are generally not fused together to form grains, as in the case of a sintered ceramic material. As used herein, description of nanoparticle binder extends to one or multiple species of binders.

The nanoparticle binder material may comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

Before the mixture is spray dried to form the aggregates, the mixture may include an amount of nanoparticle binder material ranging between about 0.1% to about 80%, preferably ranging between about 10% to about 70% on a wet basis, more preferably about 20% to about 60%. In the spray dried abrasive aggregates, the nanoparticle binder material may constitute between about 1% to about 90% of the aggregates, preferably between about 10% to about 70% of the aggregates, and more preferably between about 15% to about 60% of the aggregates, all on a dry weight basis.

The slurry for forming the abrasive aggregates also advantageously includes a material which serves primarily as a plasticizer, also known as a dispersant, to promote dispersion of the abrasive grit within the thus formed aggregates. Further, Applicants have discovered that dual function materials that provide plasticizer activity as well as impart beneficial anti-loading properties are particularly beneficial in certain applications, such as the repair of coated surfaces.

Anti-loading properties are beneficial because abrasive products are subject to "loading", wherein "swarf", or abraded material from a work surface, accumulates on the abrasive surface and between the abrasive particles. Loading is undesirable because it typically reduces the performance of the abrasive product. "Antiloading" properties reduce the tendency of an abrasive product to accumulate swarf.

Counter to known methods of applying anti-loading agents externally to a completed aggregate, for example, as part of a make coat or size coat mixture, the dual function material that acts as a plasticizer and imparts anti-loading properties is incorporated directly into the wet formula of the aggregate. Due to the low processing temperatures used, this material is believed to remain in the thus formed aggregates.

Dual function materials that act as plasticizers and anti-loading agents include both organic and inorganic materials, including surfactants and other surface tension modifying species. Particular embodiments make use of organic species, such as polymers and monomers. Particular embodiments make use of an anionic surfactant. In an exemplary embodiment the dual function material is a metallic salt of a dicarboxylic acid. In an embodiment, the metal may be sodium, aluminum, calcium, magnesium, lead, zinc, or combinations thereof, while the dicarboxylic acid may vary in length from between 2 and 12 carbons, typically ethanedioic ($C_2$), propanedioic ($C_3$), butanedioic ($C_4$), pentanedioic ($C_5$), hexanedioic ($C_6$), heptanedioic ($C_7$), octanedioic ($C_8$), nonanedioic ($C_9$), decanedioic ($C_{10}$), undecanedioic ($C_{11}$), and dodecanedioic ($C_{12}$) acids, or combinations thereof, not inclusive of functional groups. In another embodiment, the dual function material is a sulfonate, such as a salt or ester of a sulfonic acid. In a particular embodiment, the dual function material is dioctyl sodium sulfosuccinate, also called by IUPAC name, sodium 1,4-bis(2-ethylhexoxy)-1,4-dioxobutane-2-sulfonate.

The amount of the dual function material in the mixture, before spray drying, may range between about 0.5% to about 40%, and preferably between about 0.5% to about 10%, and more preferably from about 2% to about 8%. The amounts of the dispersant in the aggregate after spray drying may range between about 0.5% to about 20%, preferably between 0.5% to about 10%, more preferably at least 3% and not more than 7%.

The grain slurry mixture for forming the abrasive aggregates also advantageously includes a material that serves as a cross-linking agent. Cross-linking agents include carbohydrates, including polysaccahrides, monosaccahrides, and natural organic substance giving monosaccharides by hydrolysis. For example, starches, sugars, cellulose, glucose, fructose, maltose, amylopectin, amylose, cellulose. In an embodiment, the cross-linker is a starch. Starches include modified starches, such as dextrin, polydextrin, cyclodextrin, malto-dextrin, and combinations thereof. Dextrin includes mixtures of polymerized glucosans with a molecular formula of $(C_6H_{10}O_5)n$ that are obtained by partial hydrolysis of starch of by heat, alkali, and enzymes. In a particular embodiment, the cross-linking agent is dextrin. Dextrin can be white dextrin, yellow dextrin, or British gum.

The concentrations of cross-linking agent in the grain slurry mixture, prior to spray drying may range between 0.5% and 15%, and preferably between 1% and 10%, more preferably between 1.5% and 7% by weight of the wet mixture. The concentrations of cross-linking agent in the aggregate after spray drying may range between 0.5% and 15%, and preferably between 1% and 10%, more preferably between 3% and 8% by weight.

As should be clear, the grain slurry mixture used for forming the aggregates contains major species of abrasive grit, nanoparticle binder, a dual function material, and a cross-linking agent. These species may be present in various relative contents in the composition for forming the aggregates. The relative solids content in the spray dried aggregates should minor the solids content in the slurry mixture composition for forming the aggregates, however there may be some alteration due to drying/volatilization during the spray drying process. [The grain slurry mixture may include about 0.1 to about 50 weight percent of the abrasive grit particles, from about 0.1 to about 80 weight percent of the nanoparticle binder, from about 0.5 to about 40 weight percent of the dual function material, and about 0.5 to about 15 weight percent of a cross-linking agent. In certain embodiments, the slurry composition can contain about 10 to about 40 weight percent abrasive grit particles, about 10 to about 70 weight percent nanoparticle binder, about 0.5 to about 10 weight percent dual function material, and about 1 to about 10 weight percent cross-linking agent. Particular embodiments of the slurry composition can contain about 20 to 40 weight percent abrasive grit particles, about 20 to 60 weight percent nanoparticle binder, about 2 to 8 weight percent dual function material, and about 2 to 9 weight percent cross-linking agent.]

Optionally, a defoaming agent may be added to the grain slurry mixture (slurry composition). Defoaming agents are well known in the art and an exemplary defoaming agent is a silicone-free, organic defoamer. The amount of defoaming agent in the grain slurry mixture can be from about 0.0% to about 0.5% by weight. It is expected that the defoaming agent added is volatilized by the spray drying process and is not detectable in the formed aggregate.

A volatile liquid is also included in the wet aggregate composition, which acts as a carrier and serves to liquefy or fluidize the mixture of the abrasive grit particles, the nanoparticle binder material, the dual function material, the cross-linking agent, and any optionally added defoaming agent, so that the mixture may be flowed into a spray dryer, nebulized into fine aggregate droplets, and dried therein. Preferably, the volatile liquid carrier is deionized water, although other volatile liquids may be used that will be driven off by typical spray drying temperatures and do not substantially alter the composition of the mixture. The liquefied mixture may include the abrasive grit particles, the nanoparticle binder material, a dual function material, a cross-linking agent, optionally a defoaming agent, with the balance being a volatile liquid. The composition, in the form of a slurry, can be water-based and can include between about 10% to about 40% abrasive grit particles, between about 10% to about 70% nano particle binder, between about 0.5% to about 10% dual function material, about 1% to about 10% cross-linking agent, and optionally about 0% to about 0.5% defoaming agent, where percentages are based on total weight of the slurry.

During processing, it should be noted that in certain embodiments according to the present disclosure, it is preferred to substantially remove any accumulated static charges from the grit particles prior to their addition to the mixture. It has been observed that the stability of the aggregates formed in the spray drying step is substantially improved if the grit particles are substantially free of accumulated Coulombic charges. Once well mixed, the liquefied mixture, including the components of the abrasive grit particle, the nanoparticle binder material, the dual function material, the cross-linking agent, and any optional defoaming agent, is then processed in a spray dryer in order to form the abrasive aggregates.

Abrasive Coating Slurry and Preparation

In an embodiment, the abrasive aggregates are preferably combined with a resin material, or resin mixture, that can be used to adhere the abrasive aggregates onto a surface of a backing. Processes for combining the abrasive aggregates with the resin bonding material include slurry formation, in which the abrasive aggregates, resin, and other additives are combined together until thoroughly mixed. In connection with slurry coating a backing, in addition to the abrasive aggregates, the slurry coating generally also includes a solvent such as water or an organic solvent and a polymeric resin material. The abrasive slurry may additionally comprise other ingredients, such as organic solvents, thixotropic agents, dual function materials, crosslinking agents, surfactants, chain transfer agents, stabilizers, dispersants, curing agents, reaction mediators, pigments, dyes, colorants, and fillers. In an embodiment, the slurry can include polymeric resin, abrasive aggregates, one or more organic solvents, one or more catalysts, and one or more crosslinking agents. In another embodiment, the abrasive slurry may, optionally, include a surfactant.

All the slurry ingredients are thoroughly mixed together using, for example, a high shear mixer. Mixing can be conducted using high shear conditions, moderate shear conditions, low shear conditions, or combinations thereof. Typically, mixing occurs until the ingredients are thoroughly mixed.

In an embodiment, polymer resin and surfactant are mixed together to form a base mixture under low shear to moderate shear conditions. Abrasive aggregates are then added to the base mixture under high shear conditions. To complete the formation of the abrasive slurry, a thixotrope can be added to the base mixture under low shear conditions followed by the addition of a cross-linker, also under low shear conditions.

In an embodiment, the abrasive slurry has a composition that can include
between about 10 wt % to about 20 wt % polymer resin,
between about 25 wt % to about 50 wt % abrasive aggregates
between about 0.2 wt % to about 1.0 wt % crosslinking agent,
between about 0.01 wt % to about 0.04 wt % catalyst agent
with the remainder organic solvent, where the percentages are based on total weight of the abrasive slurry. Optionally, between about 0.1 wt % to about 0.5 wt % of a surfactant can also be added to the abrasive slurry. If the surfactant is included, the amount of organic solvent can be adjusted so that the total amounts add up to 100 wt %.

The viscosity of the abrasive slurry can be monitored as it is being prepared. In an embodiment, the viscosity of the abrasive slurry is in a range of about 50 cps to about 200 cps prior to addition of the thixotropic agent and the crosslinking agent. After the addition of the thixotropic agent and the crosslinking agent, the abrasive slurry can have a viscosity in the range of about 210 to about 450 cps.

During mixing of the abrasive slurry ingredients, the ingredients may be added to the slurry one by one, in batches, or all at once. Typically the ingredients are added one by one to the abrasive slurry. If the ingredients are added one by one or in batches, the slurry can be agitated for a period of time until the ingredient has sufficiently mixed into the slurry. Typical agitation times range from about 1 minute to about 2 hours, depending on the ingredient or ingredients being added to the abrasive slurry.

In an embodiment, the abrasive slurry will have a ratio of green, unfired abrasive aggregate to polymeric resin in the range from about 2:1 to about 3:1, about 2.25:1 to about 2.75:1, or about 2.5:1. In another embodiment, the abrasive slurry will have a ratio of polymeric resin to crosslinking agent ranging from about 5:1 to about 45:1, or from about 9:1 to about 40:1.

Suitable Polymer Resins

Suitable polymeric resin materials include polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. A polymeric resin mixture may include more than one kind of a polymer resin from a class of polymer resins; for example, a polyester resin may be a mixture of copolyester resins. In an embodiment, the polymeric resin comprises a single polyester resin, a single copolyester resin, multiple copolyester resins, or mixtures thereof. In a particular embodiment, the polymeric resin is single copolyester resin. In another particular embodiment, the polymeric resin is a mixture of two different copolyester resins. In an embodiment, the total amount of polymeric resin in the abrasive slurry can be at least about 10 wt %, at least about 12 wt %, at least about 13 wt %, at least about 14 wt %, or at least about 15 wt %. In another embodiment, the amount of polymeric resin in the abrasive slurry can be not greater than about 20 wt %, not greater than about 19 wt %, not greater than about 18 wt %, or not greater than about 17 wt %. The amount of polymeric resin in the abrasive slurry can be within a range comprising any pair of the previous upper and lower limits. In a particular embodiment, the amount of polymeric resin included in the abrasive slurry can be in the range of at least about 10 wt % to not greater than about 20 wt %.

Polyester Resin

Suitable polyester resins include linear, saturated copolyester resins that can be amorphous and highly-soluble in standard solvents, such as methyl ethyl ketone (2-butanone) (MEK), Toluol, ethyl acetate, and acetone. Alternatively, other suitable polyester resins can be semi-crystalline to crystalline products that have limited solubility and are applied with solvents such as 1, 3 Dioxolane or tetrahydrofuran (THF). In an embodiment the polyester resin can be a thermoplastic, high molecular weight, aromatic, linear saturated copolyester resin. For example, Vitel 2210 (Rohm and Haas Company, a wholly owned division of Dow Chemical, Philadelphia, Pa., USA), Skybon ES-120 (SK Chemicals, South Korea or Worthen Industries, Nashua, N.H., USA), or Skybon ES-995 (SK Chemicals, South Korea or Worthen Industries, Nashua, N.H., USA). In an embodiment, the total amount of polyester resin in the abrasive slurry can be at least about 5.0 wt %, at least about 8.0 wt %, or at least about 10 wt %. In another embodiment, the amount of polyester resin in the abrasive slurry can be not greater than about 20 wt %, not greater than about 19 wt %, not greater than about 18 wt %, or not greater than about 17 wt %. The amount of polyester resin in the abrasive slurry can be within a range comprising any pair of the previous upper and lower limits. In a particular embodiment, the amount of polyester resin included in the abrasive slurry can be in the range of at least about 10 wt % to not greater than about 20 wt %, or at least about 10 wt % to not greater than about 18 wt %, or at least about 12 wt % to not greater than about 17 wt %.

In an embodiment, the polymeric resin is one of the group consisting of a polyester resin, a copolyester resin, a mixture of more than one copolyester resin, and combinations thereof. In another embodiment, the polymeric resin is a single copolyester resin. In a particular embodiment, the polymeric resin is a mixture of two different copolyester resins (i.e., a first copolyester resin and a second copolyester resin). In another embodiment, the first copolyester resin is a hard resin and the second copolyester resin is a soft resin. In another embodiment, the ratio of the first copolyester resin to the second copolyester resin is about 9:1 to about 0.25:1. In a particular embodiment, the ratio of the hard copolyester resin to the soft copolyester resin is about 1:1.

The polymeric resins can be solvent borne copolyester resins. In an embodiment, a first copolyester resin, such as a hard resin, has an intrinsic viscosity of at least 0.50 dl/g, a glass transition temperature (Tg) of at least 65° C. (such as by DSC), a number average molecular weight (Mn) of at least 15,000, and an OH value from 2-6 KOHmg/g, and a softening point of at least 130° C. In another embodiment, a second copolyester resin, such as a soft resin, has an intrinsic viscosity of at least 0.38 dl/g, a glass transition temperature (Tg) of at least 55° C., a number average molecular weight (Mn) of at least 11,000, and an OH value from 9-15 KOHmg/g, and a softening point of at least 120° C. In a particular embodiment, the first copolyester resin has an intrinsic viscosity of 0.53 dl/s, a glass transition temperature (Tg) of 65° C., a number average molecular weight (Mn) of 18,000, an OH value from 2-6 KOHmg/g, and a softening point of 135° C. In another particular embodiment, the second copolyester resin has an intrinsic viscosity of at least 0.38 dl/s, a glass transition temperature (Tg) of at least 55° C., a number average molecular weight (Mn) of at least 11,000, and an OH value from 9-15 KOHmg/g, and a softening point of at least 120° C. In another particular embodiment, the first copolyester resin, or hard copolyester resin, is Skybon ES-120. In another particular embodiment, the second copolyester resin, or soft copolyester resin, is Skybon ES-955.

Polymeric resins of the abrasive slurry can be partially dissolved with solvent (i.e., "diluted") to be more workable and have a particular percent solids range, or viscosity, depending on the application. In an embodiment, the polymeric resin of the abrasive slurry can have a percent solids between about 35 wt % and about 80 wt % based the combined polymeric resin and solvent. In another embodiment, the polyester resin can be diluted with organic solvent to have a solids content in the range of about 20 wt % to about 50 wt %. In another embodiment, the epoxy resin can be diluted with organic solvent to have a solids content in the range of about 40 wt % to about 80 wt %.

As previously discussed, suitable abrasive aggregates are those described in and produced according to the methods of U.S. Pat. No. 8,038,751 to Starling. Preferred are abrasive aggregates available from Saint-Gobain Abrasives, Inc. under the brand name Nanozyte®. In a particularly embodiment, abrasive aggregates contain silicon carbide abrasive grit. In an embodiment, the amount of abrasive aggregate in the abrasive slurry can be at least about 25 wt %, at least about 26 wt %, at least about 27 wt %, or at least about 28 wt %. In another embodiment, the amount of abrasive aggregate in the abrasive slurry can be not greater than about 50 wt %, not greater than about 48 wt %, not greater than about 46 wt %, or not greater than about 45 wt %. The amount of abrasive aggregate in the abrasive slurry can be within a range comprising any pair of the previous upper and lower limits. In a particular embodiment, the amount of abrasive aggregate included in the abrasive slurry can be in the range of at least about 25 wt % to not greater than about 50 wt %.

Suitable organic solvents are those which dissolve the resins of abrasive slurry, such as, for example, ketones, ethers, polar aprotic solvents, esters, aromatic solvents and aliphatic hydrocarbons, both linear and cyclic. Exemplary ketones include methyl ethyl ketone (2-butanone) (MEK), acetone and the like. Exemplary ethers include alkoxyalkyl ethers, such as methoxy methyl ether or ethyl ether, tetrahydrofuran, 1,4 dioxane and the like. Polar aprotic solvents include dimethyl formamide, dimethyl sulfoxide and the like. Suitable esters include alkyl acetates, such as ethyl acetate, methyl acetate and the like. Aromatic solvents include alkylaryl solvents, such as toluene, xylene and the like and halogenated aromatics such as chlorobenzene and the like. Hydrocarbon type solvents include, for example, hexane, cyclohexane and the like. A preferred organic solvent is methyl ethyl ketone. In an embodiment, the amount of organic solvent in the abrasive slurry can be at least about 5.0 wt %, at least about 6.0 wt %, at least about 7.0 wt %, or at least about 8.0 wt %. In another embodiment, the amount of organic solvent in the abrasive slurry can be not greater than about 68 wt %, not greater than about 67 wt %, not greater than about 66 wt %, not greater than about 65 wt %, or not greater than about 64 wt %. The amount of organic solvent in the abrasive slurry can be within a range comprising any pair of the previous upper and lower limits. In a particular embodiment, the amount of organic solvent included in the abrasive slurry can be in the range of at least about 5.0 wt % to not greater than about 68 wt %.

Suitable surfactants are those that have a low solubility in water and that have amphipathic properties. In an embodiment, lecithin is a surfactant. In an embodiment, the amount of surfactant in the abrasive slurry can be at least about 0.1 wt %, at least about 0.125 wt %, or at least about 0.15 wt %. In another embodiment, the amount of surfactant in the abrasive slurry can be not greater than about 0.5 wt %, not greater than about 0.4 wt %, not greater than about 0.375 wt %, or not greater than about 0.35 wt %. The amount of surfactant in the abrasive slurry can be within a range comprising any pair of the previous upper and lower limits. In a particular embodiment, the amount of surfactant included in the abrasive slurry can be in the range of at least about 0.1 wt % to not greater than about 0.5 wt %.

Suitable catalyst agents (i.e., catalysts) are materials that promote polymeric reactions. In an embodiment, the catalyst can be an amine neutralized mixture of sulfonic acids. In another embodiment, the catalyst can be a tetravalent diorganotin. More than one type of catalyst or mixtures of catalyst can be used in the abrasive slurry mixture. In an embodiment, the amount of catalyst in the abrasive slurry can be at least about 0.01 wt %, at least about 0.015 wt %, or at least about 0.0175 wt %. In another embodiment, the amount of catalyst in the abrasive slurry can be not greater than about 0.04 wt %, not greater than about 0.0375 wt %, not greater than about 0.035 wt %, or not greater than about 0.0325 wt %. The amount of catalyst in the abrasive slurry can be within a range comprising any pair of the previous upper and lower limits. In a particular embodiment, the amount of catalyst included in the abrasive slurry can be in the range of at least about 0.01 wt % to not greater than about 0.04 wt %.

Suitable cross-linking agents are those that promote crosslinking of the polymeric resin materials in the abrasive slurry. Preferred, the crosslinking agent promotes crosslinking of polyester resin, or epoxy resin, or combinations thereof. It should be recognized that the crosslinking agents of the abrasive slurry are not necessarily related to the crosslinking agents of the abrasive aggregate. In an embodiment, cross-linking agents can be isocyanates, including polyisocyanates. In another embodiment, crosslinking agents can be a methylated melamine. In an embodiment, the amount of cross-linking agent in the abrasive slurry can be at least about 0.2 wt %, at least about 0.3 wt %, or at least about 0.4 wt %. In another embodiment, the amount of cross-linking agent in the abrasive slurry can be not greater than about 1.0 wt %, not greater than about 0.8 wt %, or not greater than about 0.7 wt %. The amount of cross-linking agent in the abrasive slurry can be within a range comprising any pair of the previous upper and lower limits. In a particular embodiment, the amount of cross-linking agent included in the abrasive slurry can be in the range of at least about 0.1 wt % to not greater than about 1.0 wt %.

Applying the Abrasive Slurry to Backing

The abrasive slurry containing the abrasive aggregate grains is preferably applied to the backing using a blade spreader to form a coating. Alternatively, the slurry coating may be applied using slot die, smooth rolling, gravure, or reverse gravure coating methods. The coating thickness may range from about 1 to about 5 mils in thickness, after drying. As the backing is fed under the blade spreader at a desired coating speed, the abrasive slurry is applied to the backing in the desired thickness. The coat speed is preferably between about 10 to about 40 feet per minute.

Figure 8:
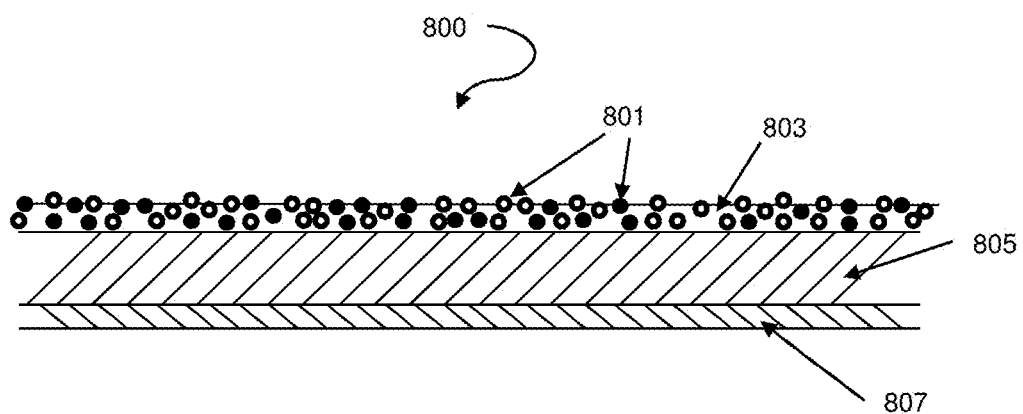
FIG. 8 is a cross-sectional illustration of an embodiment of a coated abrasive article having green unfired aggregates dispersed in a polymeric slurry The use of the same reference symbols in different drawings indicates similar or identical items.

In an alternate embodiment, a resin mixture is first coated onto the backing, and the abrasive aggregates are placed onto the resin coated backing through electrostatic attraction (sometimes called "upcoating") or simply down through gravity (e.g., sprinkled onto the backing). Both approaches are well understood in the art, generally first depositing a 'make coat' on the backing, followed by abrasive aggregate application onto the make coat, and subsequent deposition of a 'size coat.' Optionally, a supersize coat may be deposited over the size coat. Further, a pliant coat may be disposed between the make coat and the backing. In another embodiment, a back coat may be disposed over the backing on a side opposite the make coat. FIG. 8 shows an embodiment of an abrasive product 800 comprising abrasive aggregates 801 dispersed in a resin composition 803 (an abrasive slurry layer) that is disposed on a backing 805, which also has an optional back coat 807.

Curing the Abrasive Slurry

The coated backing is then heated in order to cure the resin and bond the abrasive aggregate grains to the backing. The resin can be at least partially cured or fully cured. Additional molding or forming of the partially cured coating can be performed prior to full curing. In general, the coated backing is heated to a temperature of between about 100° C. to less than about 250° C. during the curing process. In certain embodiments of the present disclosure, it is preferred that the curing step be carried at a temperature of less than about 200° C.

Once the resin is fully cured, the abrasive aggregates are bonded to the backing and the coated backing may be used for a variety of stock removal, finishing, and polishing applications.

In an embodiment the cured abrasive coating has a composition that can include
between about 20 wt % to about 40 wt % polymer resin,
between about 85 wt % to about 50 wt % abrasive aggregates
between about 0.4 wt % to about 2.0 wt % crosslinking agent, and
between about 0.1 wt % to about 0.04 wt % catalyst,
wherein the percentages are based on total weight of the cured abrasive coating. Optionally, between about 0.5 wt % to about 3.0 wt of a surfactant can also be included in the cured abrasive coating. If the surfactant is included, the amount of abrasive aggregate can be adjusted so that the total amounts add up to 100 wt %.

In an embodiment, the total amount of polymeric resin in the cured abrasive coating can be at least about 20 wt %, at least about 21 wt %, at least about 22 wt %, at least about 23 wt %, or at least about 24 wt %. In another embodiment, the amount of polymeric resin in the cured abrasive coating can be not greater than about 40 wt %, not greater than about 38 wt %, not greater than about 36 wt %, not greater than about 34 wt %, or not greater than about 32 wt %. The amount of polymeric resin in the cured abrasive coating can be within a range comprising any pair of the previous upper and lower limits. In a particular embodiment, the amount of polymeric resin included in the cured abrasive coating can be in the range of at least about 20 wt % to not greater than about 40 wt %, at least about 22 wt % to not greater than about 38 wt %, or at least about 24 wt % to not greater than about 36 wt %.

In an embodiment, the amount of polyester resin in the cured abrasive coating can be at least about 20 wt %, at least about 21 wt %, at least about 22 wt %, at least about 23 wt %, or at least about 24 wt %. In another embodiment, the amount of polyester resin in the cured abrasive coating can be not greater than about 40 wt %, not greater than about 38 wt %, not greater than about 36 wt %, not greater than about 34 wt %, or not greater than about 32 wt %. The amount of polyester resin in the cured abrasive coating can be within a range comprising any pair of the previous upper and lower limits. In a particular embodiment, the amount of polyester resin included in the cured abrasive coating can be in the range of at least about 20 wt % to not greater than about 40 wt %, at least about 22 wt % to not greater than about 38 wt %, or at least about 24 wt % to not greater than about 36 wt %.

In an embodiment, the amount of abrasive aggregate in the cured abrasive coating can be at least about 50 wt %, at least about 52 wt %, at least about 54 wt %, at least about 56 wt %, or at least about 58 wt %. In another embodiment, the amount of abrasive aggregate resin in the cured abrasive coating can be not greater than about 85 wt %, not greater than about 83 wt %, not greater than about 80 wt %, not greater than about 77 wt %, or not greater than about 75 wt %. The amount of abrasive aggregate resin in the cured abrasive coating can be within a range comprising any pair of the previous upper and lower limits. In a particular embodiment, the amount of abrasive aggregate resin included in the cured abrasive coating can be in the range of at least about 50 wt % to not greater than about 85 wt %, at least about 52 wt % to not greater than about 83 wt %, at least about 54 wt % to not greater than about 80 wt %, at least about 56 wt % to not greater than about 78 wt %, at least about 58 wt % to not greater than about 77 wt %.

In an embodiment, the amount of catalyst in the cured abrasive coating can be at least about 0.01 wt %, at least about 0.0125 wt %, at least about 0.015 wt %, or at least about 0.0175 wt %. In another embodiment, the amount of catalyst resin in the cured abrasive coating can be not greater than about 0.04 wt %, not greater than about 0.0375 wt %, not greater than about 0.035 wt %, or not greater than about 0.035 wt. The amount of catalyst in the cured abrasive coating can be within a range comprising any pair of the previous upper and lower limits. In a particular embodiment, the amount of catalyst included in the cured abrasive coating can be in the range of at least about 0.01 wt % to not greater than about 0.04 wt %.

In an embodiment, the amount of cross-linking agent in the cured abrasive coating can be at least about 0.4 wt %, at least about 0.5 wt %, at least about 0.6 wt %, at least about 0.7 wt %, or at least about 0.8 wt %. In another embodiment, the amount of cross-linking agent resin in the cured abrasive coating can be not greater than about 2.0 wt %, not greater than about 1.9 wt %, not greater than about 1.8 wt %, not greater than about 1.7 wt %, or not greater than about 1.6 wt %. The amount of cross-linking agent resin in the cured abrasive coating can be within a range comprising any pair of the previous upper and lower limits. In a particular embodiment, the amount of cross-linking agent resin included in the cured abrasive coating can be in the range of at least about 0.4 wt % to not greater than about 2.0 wt %.

Backing

The cured abrasive coated backing may them be used as a lapping film or a micro-finishing film for finishing and/or polishing other materials. Backing materials which may be coated in this manner include, but are not limited to, any flexible web, including polymeric film, paper, cloth, metallic film, vulcanized fiber, non-woven substrates, and any combinations of the foregoing, and treated versions of the foregoing materials. The backing preferably comprises a polymeric film, such as a film of polyester, polyurethane, polypropylene, polyimides such as KAPTON from DuPont. Polyester films are particularly preferred as the backing material in certain embodiments of the present disclosure. The film preferably can be primed to promote adhesion of the abrasive aggregates to the backing. Suitable backings may have a thickness, before being coated, of from about 1 to about 14 mils. The backing can be laminated to another substrate for strength, support, or dimensional stability. Lamination can be accomplished before or after the abrasive article is formed. The abrasive article can be in the form of an endless belt, a disk, a sheet, or a flexible tape that is sized so as to be capable of being brought into contact with a workpiece. The abrasive aggregates can be disposed on one or both major surfaces of the backing.

Repair of Automotive Coatings On Surfaces

The abrasive product can be used for stock removal, finishing, and polishing of surfaces coated with primers, paints, clearcoats, and combinations thereof. In a particular embodiment, the abrasive product can be used for stock removal, finishing, and polishing of surfaces coated with automotive primers, automotive paints, automotive clearcoats, and combinations thereof.

When used for polishing or repair of coated surfaces, the abrasive products are preferably produced including abrasive aggregates formed from silicon carbide grit combined with a silica nanoparticle binder. The grit particles preferably have a size of in the range of about 6 micrometers to about 12 micrometers, with an average size of about 9 micrometers. The overall size of the abrasive aggregates is preferably from about 30 micrometers to about 90 micrometers. These abrasive aggregates are preferably bonded to polyester polymeric film backing. Using the abrasive product, polishing of the surfaces may be carried out, for example, using metal polishing machines such as those available from Struers, Inc. of Westlake, Ohio), Grinding Equipment & Machinery Company, LLC. ("GEM") (Youngstown, Ohio, USA), Loeser-USA Inc. (Brighton, Mich., USA), Supfina Machine Company, Inc. (North Kingstown, R.I., USA), and Dynabrade Inc. (Clarence, N.Y., USA).

Such metal polishing machines are known in the art and typically take advantage of embodiments of the abrasive product in the form of sheets, discs, endless belts, tapes, or polymeric films.

State-of-art conventional finishing processes are typically accomplished by a multi-step, incremental process. The surface is first polished with a relatively coarse abrasive material and then polished again with a somewhat finer grit abrasive material. This process is usually repeated several times, with each successive polishing being carried out with a progressively finer grit abrasive until the surface is polished to the desired degree of smoothness. This type of multi-step polishing procedure has conventionally been required because it is generally understood that the grains of an abrasive must be on the same scale as the size of the defect (e.g., scratches, pig tails, fish eyes, dust) which are to be removed.

In contrast to the conventional multi-step procedure, however, it has been quite surprisingly and unexpectedly observed that coated surfaces can be polished down to a an acceptable surface roughness using a reduced number of polishing steps, sometimes even in only a single step, as well as, using only a single abrasive product, rather than multiple different abrasive products. This result is quite surprising and highly advantageous. It has been observed that when abrasive products according to the present disclosure are used, the entire polishing can be accomplished using only one abrasive product. This results in a considerable reduction in the time needed to achieve a desired degree of polishing smoothness, as well as marked reduction in costs due to time saved by not having to switch out successive different abrasive products, as well as not needing to use the multiple abrasive products. Without being bound by theory, it is believed that the advantage may be derived, at least in part, from the unique properties of the green, unfired abrasive aggregates in combination with the composition of the polymer resin coatings of the present disclosure.

Various surface roughness parameters are known in the art and used to describe the surface quality. The arithmetical mean ("average") roughness, or Ra, of a surface is a measure of the degree of variations in the overall height profile of a surface over a given standard length. Root mean square roughness, Rq, also called Rrms, is a measure of the root mean square of the roughness over a given standard length. Maximum peak, or maximum height, Ry, measures the maximum distance between the highest peak and the lowest valley along a standard length. Ten-point mean roughness, Rz, is a measure of the average of the five highest peaks and the five lowest valleys. Lower Ra, Rq, Ry, and Rz values are generally indicative of a surface that is smoother and has smaller variations in its overall height between differing locations on the surface (i.e., it has a generally smoother surface profile).

Alternatively, there are many surface quality parameters that are subjective and depend upon the observations of experienced human operators for quality assessment. For example, visual assessment, touch, and even sound can be used to judge surface quality during an abrasion process.

The properties and advantage of the present disclosure are illustrated in further detail in the following nonlimiting examples. Unless otherwise indicated, temperatures are expressed in degrees Celsius, pressure is ambient, and concentrations are expressed in weight percentages.

Components Listing

Skybon ES 120 (diluted—42% solids in MEK)—thermoplastic, high molecular weight, solvent borne copolyester resin (SK Chemicals Company, Korea or SK USA, Inc, Fort Lee, N.J.).

Skybon ES 995 (diluted—42% solids in MEK)—thermoplastic, high molecular weight, copolyester resin (SK Chemicals Company, Korea or SK USA, Inc, Fort Lee, N.J.).

Methyl Ethyl Ketone (MEK)—commonly commercially available, reagent grade.

Toluene—commonly commercially available, reagent grade.

Yelkins TS—Soya lecithin (Archer Daniels Midland Company, Decatur, Ill., USA).

BYK-410—thixotropic agent solution of modified urea (BYK USA Inc., Wallingford, Conn.).

Coreactant F—isocyanate crosslinking agent (Rohm and Haas Company, a wholly owned division of Dow Chemical, Philadelphia, Pa.).

Dabco T-12—bibutyltindilaurate, a tetravalent diorganotin catalyst (Air Products and Chemicals, Inc., Performance Chemicals Division, Allentown, Pa.).

Cymel 301—Highly methylated melamine crosslinker (Cytec Industries, Inc., Woodland Park, N.J.).

Nacure XC-9211—amine neutralized catalyst, based on a mixture of sulfonic acids (King Industries, Inc., Norwalk, Conn.).

Bindzil 2040—colloidal silica solution (available from Eka Chemicals Inc. of Marietta, Ga.)

NGC-2500—green silicon carbide abrasive grit, average particle size 8 microns (Nanko Abrasives, Inc., Tokyo, Japan)

Aerolsol OT-100—sodium dioctyl sulfosuccinate, a diester sulfosuccinate dual function material, i.e., a dispersant and anionic surfactant (Cytec Industries, Inc., Woodland Park, N.J.).

SURFYNOL DF-210—defoamer, silicone free (Air Products and Chemicals Inc. of Allentown, Pa.).

EXAMPLE 1

Making of Coated Abrasive Product

A. Abrasive Aggregate

Green, unfired abrasive aggregate was made according to the teachings and methods described herein and as in U.S. Pat. No. 8,038,751 to Starling. Grain slurry compositions were prepared and spray dried. The constituents of the grain slurries and resulting abrasive aggregates are shown in Table 1. The abrasive aggregates were collected and sieved though a 170 mesh screen and had an average abrasive aggregate particle size of micrometers.

TABLE 1

Abrasive Aggregates Compositions

| Component | Grain Slurry 1 Wt % | Abrasive Aggregate 1 Wt % | Grain Slurry 2 Wt % | Abrasive Aggregate 2 Wt % |
|---|---|---|---|---|
| BINDZIL 2040 | 54.36 | 43.29 | 33.85 | 26.96 |
| Aerosol OT-100 | 2.75 | 5.48 | 2.75 | 5.48 |
| Dextrin | 2.93 | 5.87 | 2.94 | 5.87 |
| Deionized water | 17.16 | — | 29.48 | — |
| SURFYNOL DF-210 | 0.22 | 0.43 | .22 | .43 |
| NGC-2500 | 22.58 | 44.95 | 30.77 | 61.28 |
| Total | 100 | 100 | 100 | 100 |

The collected Abrasive Aggregate 1 was saved for incorporation into an abrasive slurry composition.

B. Abrasive Slurry Preparation

An abrasive slurry composition was made by mixing together the following components listed in the table below.

TABLE 2

Abrasive Slurry Compositions

| Component | Abrasive Slurry 1 Wt % | Abrasive Slurry 2 Wt % | Abrasive Slurry 3 Wt % | Abrasive Slurry 4 Wt % | Abrasive Slurry 5 Wt % |
|---|---|---|---|---|---|
| Skybon ES-120 @ 42% in MEK | 15.15 | 15.26 | 7.63 | 7.6 | 0 |
| Skybon ES-955 @ 42% in Toluene | 0 | 0 | 7.63 | 7.6 | 15.2 |
| Organic Solvent | 45.48 | 45.82 | 45.81 | 45.64 | 45.64 |
| Yelkins TS | 0.31 | .31 | .31 | .31 | .31 |
| Abrasive Aggregate 1 | 37.93 | 38.21 | 38.22 | 38.07 | 38.07 |
| Coreactant F | 1.11 | 0 | 0 | 0 | 0 |
| Dabco T-12 | .02 | 0 | 0 | 0 | 0 |
| Cymel 301 | 0 | .38 | .38 | .76 | .76 |
| Nacure XC-9211 | 0 | .01 | .01 | .02 | .02 |
| Total | 100.0 | 99.99 | 99.99 | 100.0 | 100.0 |

For each composition, diluted Skybond ES-120 (42% solids), diluted Skybon ES-955 (42% solids), Organic solvent, Yelkins TS, Abrasive Aggregate 1, crosslinker, and catalyst were mixed together in a high shear mixer until thoroughly mixed. The mixtures were again agitated under high shear and the abrasive aggregates were added until thoroughly mixed in. The mixtures were again agitated under low shear and catalyst and crosslinker were added. The mixtures were allowed to stand for approximately 45 minutes and then agitated lightly. The abrasive slurry compositions had a viscosity in the range of about 200 to 400 cps.

C. Abrasive Film Preparation

The Abrasive Slurry Compositions were applied to a 3 mil polyethylene terephthalate (PET) polymeric film. The abrasive slurry coated film was cured by oven at a temperature in the range of about 150° C. to 205° C. Upon exiting the oven, the abrasive resin coating compositions were substantially complete and the abrasive aggregates were substantially bonded to the film.

D. Cured Abrasive Composition (Cured Abrasive Layer)

The components of the resulting cured abrasive slurry compositions are listed in the table below.

TABLE 3

Cured Abrasive Compositions

| Component | Cured Abrasive Layer 1 Wt % | Cured Abrasive Layer 2 Wt % | Cured Abrasive Layer 3 Wt % | Cured Abrasive Layer 4 Wt % | Cured Abrasive Layer 5 Wt % |
|---|---|---|---|---|---|
| Skybon ES-120 @ 42% in MEK | 27.78 | 28.17 | 14.08 | 13.98 | 0 |
| Skybon ES-955 @ 42% in Toluene | 0 | 0 | 14.08 | 13.98 | 27.96 |
| Organic Solvent | 0 | 0 | 0 | 0 | 0 |
| Yelkins TS | 0.57 | .58 | .58 | .57 | .57 |
| Abrasive Aggregate 1 | 69.58 | 70.53 | 70.53 | 70.03 | 70.03 |
| Coreactant F | 2.04 | 0 | 0 | 0 | 0 |
| Dabco T-12 | .03 | 0 | 0 | 0 | 0 |
| Cymel 301 | 0 | .70 | .71 | 1.4 | 1.4 |
| Nacure XC-9211 | 0 | .02 | .02 | .04 | .04 |
| Total | 100.0 | 100.0 | 100.0 | 100.0 | 100.0 |

The abrasive articles having Cured Abrasive Layer 1, 3, and 5 were selected for abrasive testing.

EXAMPLE 2

Polishing of Surfaced Coated with Automotive Coating-Dynabrade System

A Dynabrade 1.25 inch diameter orbital sanding machine, model no. 57302, was used to compare the abrasion performance of inventive silicon carbide abrasive films prepared as described above. A state-of-the-art conventional polishing film (Trizact 3000) was used for comparison. The workpiece being polished was a metal plate coated with PPG #800 Clear Coat. The Dynabrade machine was set for grinding cycles of 3 seconds and used to make spot abrasions on the coated panel to remove dust defects "dust nibs" in the coating. The abrasive products were used to make as many spot abrasions as possible until the product life was exhausted. The operator observed for scratches, "pig tails" during abrasion, and whether the dust defect was successfully removed. Additionally, the operator made an assessment based on feel during abrasion whether the abrasive product was exhibiting an acceptable amount of "bite" (i.e., sufficient surface material was being removed) during the multiple spot abrasions. The results of the comparative testing are presented in the table below.

TABLE 4

Clear Coat Spot Abrasion/Defect Removal - Dynabrade Machine

| Parameter | Comparative Film 1 (Trizact 3000) | Inventive Film 1 (Skybon ES-120) | Inventive Film 2 (Skybon ES-955) | Inventive Film 3 (50:50 Blend ES-955) |
|---|---|---|---|---|
| Number Of Spots Per Abrasive | 3 | 3 | 10+ | 10+ |
| Pigtail Scratches During Use? | Occasional | No | Yes | No |
| Bite (Cut Rate) | High to Low | Low | Moderate | Moderate |
| Dust Defect Removal | Yes | Yes | Yes | Yes |

As shown in the table above, the control sample only had a life span of 3 spot abrasions. During use, it would "occasionally" make pig tail scratches in the test panel. The "bite" was high on the initial abrasion, but quickly deteriorated on the second and final spot abrasions to "low." The control sample did adequately remove dust defects during use.

Inventive Sample 1, which had a single "hard" copolyester resin, also only lasted for 3 spot abrasions, but advantageously, it did not ever produce pig tail scratches during testing. However, the operator reported that the "bite" was always low. Dust defects were adequately removed.

Inventive Sample 2, which had a single "soft" copolyester resin, lasted for more than 10 spot abrasions, after which the operator ended the test without the product having reached its end of life. However, this sample produced pig tail scratches more frequently than the control sample during use. The operator reported that the "bite" was "moderate" (better than "low", but not "high") throughout the test. Dust defects were adequately removed.

Inventive Sample 3, having an about equal mixture of the "hard" and "soft" copolyester resins, also lasted for more than 10 spot abrasions, after which the operator ended the test without the product having reached its end of life. The sample did not produce any pig tail scratches during testing. Dust defects were adequately removed.

While each of the inventive samples showed at least one improved performance characteristic over the control sample, the results of the above testing clearly indicate that Inventive Sample 3, having an about equal mixture of the "hard" and "soft" copolyester resins, produced all superior results over the control sample and the product life exceeded 300% of the control sample.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A coated abrasive product comprising:
a backing; and
a cured abrasive composition,
wherein the cured abrasive composition comprises
polymeric resin,
abrasive aggregates,
a crosslinking agent, and
a catalyst,
wherein the abrasive aggregates are green, unfired and have a generally spheroidal or toroidal shape and are formed from a composition comprising abrasive grit particles, a nanoparticle binder, a sulfosuccinate, and a cross-linking agent, and
wherein the cured abrasive composition is disposed on the backing.

2. The coated abrasive of claim 1, wherein the polymeric resin is one of the group consisting of a polyester resin, a copolyester resin, a mixture of more than one copolyester resin, and combinations thereof.

3. The coated abrasive of claim 1, wherein the polymeric resin is a mixture of two different copolyester resins.

4. The coated abrasive of claim 3, wherein the first copolyester resin is a hard resin and the second copolyester resin is a soft resin.

5. The coated abrasive of claim 4, wherein the ratio of the hard copolyester resin to the soft copolyester resin is about 9:1 to about 0.25:1.

6. The coated abrasive of claim 5, wherein the hard copolyester resin has an intrinsic viscosity of at least 0.50 dl/s, a glass transition temperature ($T_g$) of at least 65° C., a number average molecular weight (Mn) of at least 15,000, and an OH value from 2-6 KOHmg/g, and a softening point of at least 130° C.

7. The coated abrasive of claim 5, wherein the soft copolyester resin has an intrinsic viscosity of at least 0.38 dl/s, a glass transition temperature ($T_g$) of at least 55° C., a number average molecular weight (Mn) of at least 11,000, and an OH value from 9-15 KOHmg/g, and a softening point of at least 120° C.

8. The coated abrasive product of claim 1, wherein the cured abrasive composition further comprises a surfactant.

9. The coated abrasive product of claim 1, wherein the ratio of green, unfired abrasive aggregate to polymeric resin ranges from about 2:1 to about 3:1.

10. The coated abrasive product of claim 1, wherein the ratio of polymeric resin to crosslinking agent ranges from about 45:1 to about 5:1.

11. The coated abrasive product of claim 1, wherein the cured abrasive composition comprises
about 10 wt % to about 20 wt % polymeric resin,
about 25 wt % to about 50 wt % green, unfired abrasive aggregates,
about 0.2 wt % to about 1.0 wt % of crosslinking agent, and
about 0.01 wt % to about 0.04 wt % of catalyst.

12. The coated abrasive product of claim 11, wherein the cured abrasive composition further comprises about 0.1 wt % to about 0.5 wt % of surfactant.

13. The coated abrasive product of claim 1, wherein the backing is a polymeric film.

14. The coated abrasive product of claim 1, wherein the abrasive aggregate comprises
about 2 wt % to about 10 wt % of a sulfosuccinate based on the weight of the aggregate,
about 2 wt % to about 10 wt % of a cross-linking agent based on the weight of the aggregate,
about 30 wt % to about 50 wt % of abrasive grit particles based on the weight of the aggregate, and
about 30 wt % to about 50 wt % of nanoparticle binder based on the weight of the aggregate.

15. The coated abrasive of claim 1, wherein the sulfosuccinate of the abrasive aggregate is dioctyl sodium sulfosuccinate.

16. The coated abrasive of claim 1, wherein the cross-linking agent of the abrasive aggregate is dextrin.

17. A coated abrasive product comprising
a polymeric film backing, and
a cured abrasive composition disposed on the backing comprising:
polymeric resin;
abrasive aggregates,
a crosslinking agent; and
a catalyst;
wherein the abrasive aggregates are green, unfired and have a generally spheroidal or toroidal shape and comprise abrasive grit particles, a nanoparticle binder, a sulfosuccinate, and a cross-linking agent, and
wherein the ratio of green, unfired abrasive aggregate to polymeric resin ranges from about 1.5:1 to about 3.5:1 and the ratio of polymeric resin to crosslinking agent of the cured abrasive composition ranges from about 45:1 to about 15:1.

18. The coated abrasive product of claim 17, wherein the cured abrasive composition comprises:
about 20 wt % to about 40 wt % polymeric resin;
about 85 wt % to about 50 wt % green, unfired abrasive aggregates;
about 0.4 wt % to about 2.0 wt % of crosslinking agent; and
about 0.01 wt % to about 0.04 wt % of catalyst.

19. The coated abrasive product of claim 18, wherein the cured abrasive composition further comprises about 0.5 wt % to about 3.0 wt % of surfactant.

20. A method of making a coated abrasive product comprising:
mixing together polyester resin, abrasive aggregates, a cross-linking agent, and a catalyst, to form an abrasive slurry;
applying the abrasive slurry to a backing; and
curing the abrasive slurry to form a coated abrasive product;
wherein the abrasive aggregates are green, unfired and have a generally spheroidal or toroidal shape and comprise abrasive grit particles, a nanoparticle binder, a sulfosuccinate, and a cross-linking agent, and
wherein the ratio of green, unfired abrasive aggregate to polymeric resin ranges from about 1.5:1 to about 3.5:1 and the ratio of polymeric resin to crosslinking agent of the cured abrasive composition ranges from about 45:1 to about 15:1.

* * * * *